United States Patent [19]

Blakemore et al.

[11] Patent Number: 4,648,529

[45] Date of Patent: Mar. 10, 1987

[54] DISPENSING APPARATUS FOR STORING, DRAINING AND DISPENSING BEADS

[75] Inventors: Judith I. Blakemore, Benicia; Mark S. Hanamoto, Sausalito; Fred G. Williams, San Anselmo, all of Calif.

[73] Assignee: Cetus Corporation, Emeryville, Calif.

[21] Appl. No.: 743,798

[22] Filed: Jun. 12, 1985

[51] Int. Cl.⁴ .............................................. B65H 3/00
[52] U.S. Cl. ......................................... 221/1; 221/96; 221/98; 221/135; 221/197; 221/276; 221/286; 221/287; 221/288; 222/131; 220/20.5; 210/803
[58] Field of Search ................ 221/1, 96, 97, 98, 133, 221/135, 197, 268, 276, 286, 287, 288, 289; 222/1, 130, 131; 215/6; 220/20, 20.5; 210/803, 800, 514; 43/54.1, 55, 56

[56] References Cited

U.S. PATENT DOCUMENTS

| | | | |
|---|---|---|---|
| 1,470,199 | 10/1923 | Small | 220/20 X |
| 1,554,066 | 9/1925 | Boros | 43/54.1 X |
| 1,974,332 | 9/1934 | Hauck | 221/281 |
| 2,369,232 | 2/1945 | Hinton | 221/268 X |
| 2,443,861 | 6/1948 | Johnston | 43/55 X |
| 2,518,986 | 8/1950 | Griffith | 43/55 X |
| 2,681,529 | 6/1954 | Braithwaite | 43/55 |
| 2,794,289 | 6/1957 | Sanford | 43/55 |
| 3,888,113 | 6/1975 | Miranda | 73/64.1 |
| 3,910,461 | 10/1975 | Eager | 222/131 |
| 3,932,141 | 1/1976 | Beall et al. | 141/325 X |
| 4,101,284 | 7/1978 | Difiglio et al. | 221/264 X |
| 4,226,335 | 10/1980 | Sowards | 43/55 X |
| 4,320,087 | 3/1982 | Chau et al. | 422/71 X |
| 4,405,060 | 9/1983 | Hsei | 221/135 |
| 4,415,098 | 11/1983 | Haas | 221/276 X |
| 4,428,146 | 1/1984 | Walker | 43/55 |
| 4,450,647 | 5/1984 | Schmidt | 43/55 |
| 4,483,092 | 11/1984 | Steiner | 43/55 |

FOREIGN PATENT DOCUMENTS

| | | | |
|---|---|---|---|
| 659139 | 3/1963 | Canada | 43/56 |
| 665182 | 1/1952 | United Kingdom | 221/288 |

OTHER PUBLICATIONS

Abstract of PCT WOUS83/02954, B. Jacobsen, 1 Sep. 1983, 1 pg.
Tupperware Catalog, 1984, p. 30.

Primary Examiner—Joseph J. Rolla
Assistant Examiner—P. McCoy Smith
Attorney, Agent, or Firm—Albert P. Halluin; Janet E. Hasak

[57] ABSTRACT

An apparatus and process for storing beads in a liquid medium and for draining and dispensing said beads essentially in the absence of said liquid medium is described. In one embodiment, the apparatus is designed so that the liquid medium in which the beads are stored can be captured in a separate compartment from the bead-containing compartment and the beads can be delivered without the liquid medium when the apparatus in inverted. This apparatus is designed so that the liquid medium will join with the beads for storage in the bead-containing compartment when the apparatus is upright. In another embodiment, the apparatus includes a bottle with a removable, threaded inner container which is used to drain the liquid medium from the beads prior to attachment to a separate bead dispenser.

31 Claims, 10 Drawing Figures

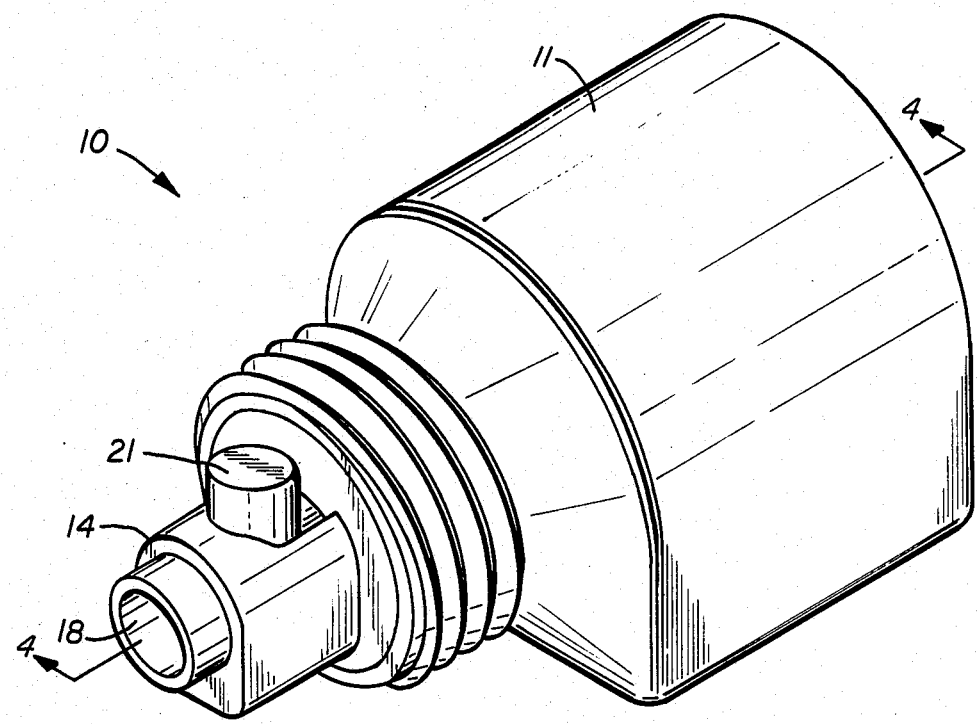
FIG._3
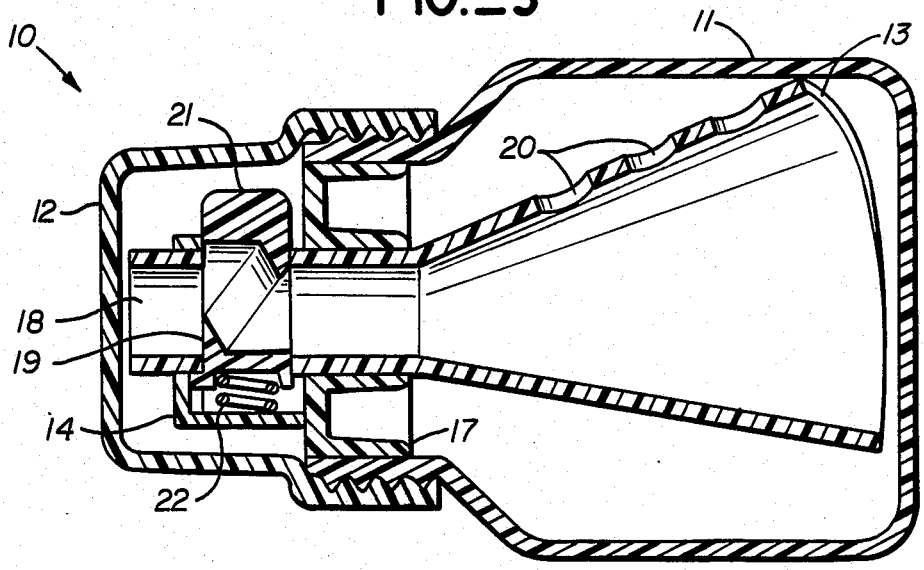
FIG._4

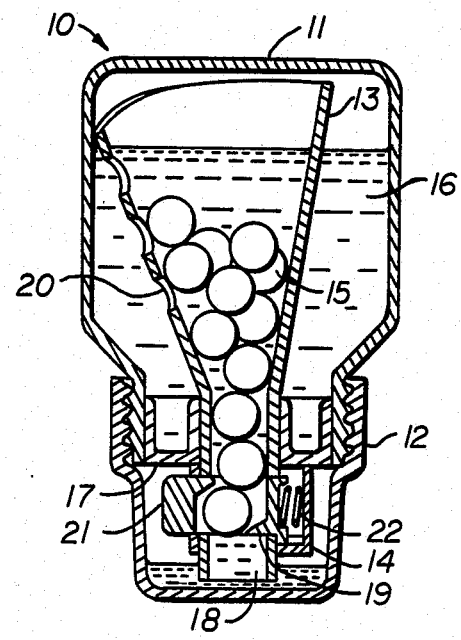
FIG._5
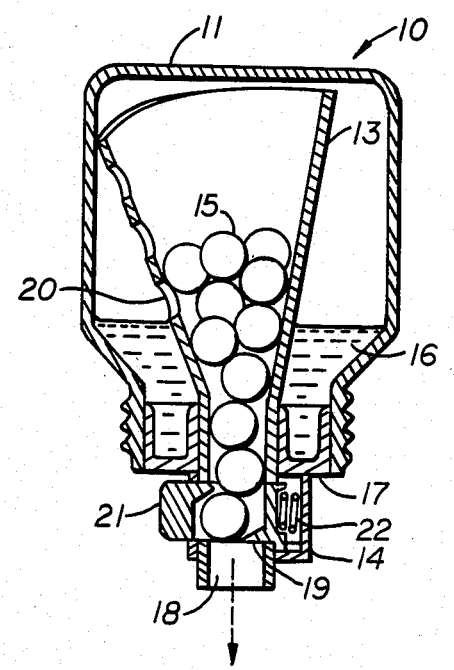
FIG._6
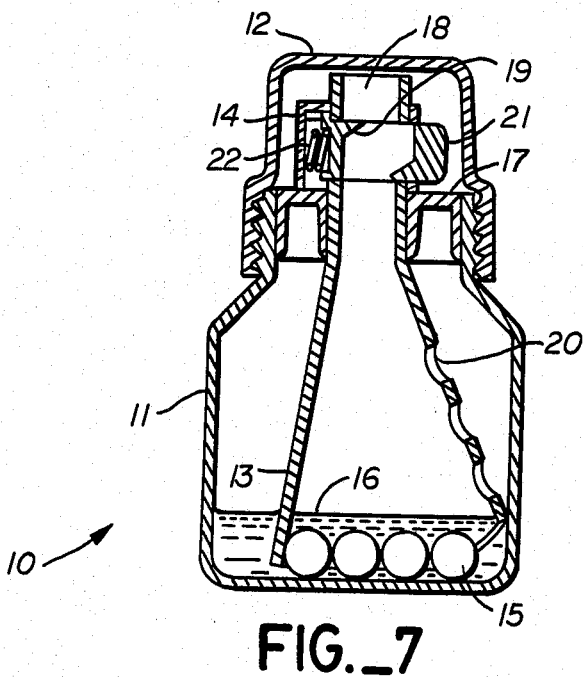
FIG._7

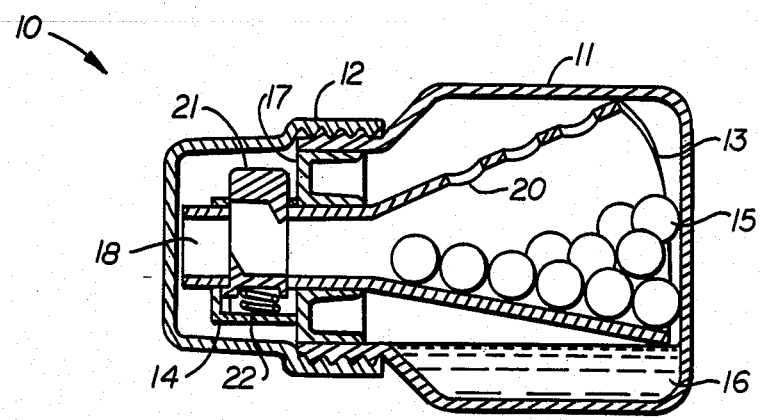
FIG._8
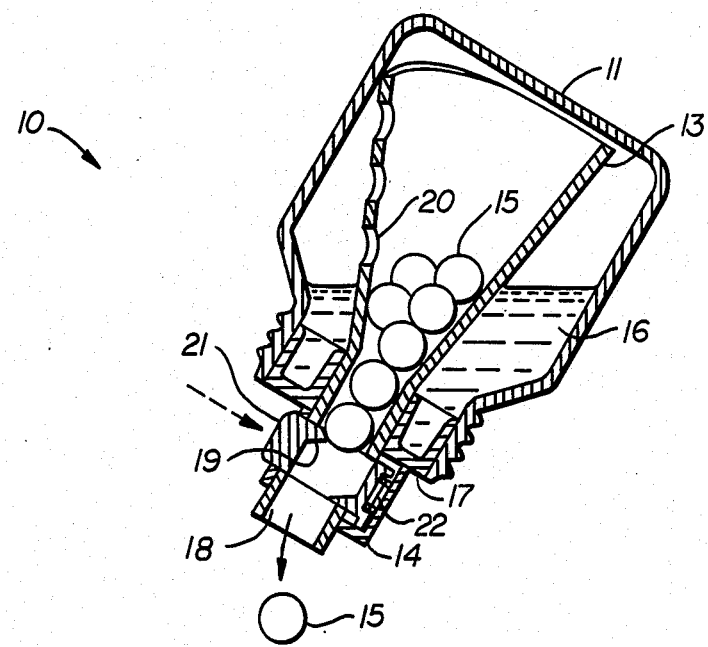
FIG._9

DISPENSING APPARATUS FOR STORING, DRAINING AND DISPENSING BEADS

BACKGROUND OF THE INVENTION

This invention relates to an apparatus for storing, draining, and dispensing beads which are stored and supplied in a liquid medium. The dispensing apparatus allows the beads to be dispensed essentially in the absence of the liquid medium.

Immunoassays employing beads are well known and have been extensively commercialized. The beads are generally used as solid phase supports for antigens or polyclonal or monoclonal antibodies, which may be covalently linked to and/or adsorbed onto the beads.

Various devices have been commercialized for dispensing beads which are supplied dry, for example, bead dispensers supplied by Abbott Laboratories, Litton Bionetics, Hybritech Inc. and Ventrex Laboratories, Inc. Typically, these dispensers are equipped with screw threads and are used by removing the cover of the bead jar and replacing it with the bead dispenser. In addition, U.S. Pat. No. 3,888,113 describes a reagent tube and stopper assembly for dispensing dry beads. U.S. Pat. No. 3,932,141 describes a receptacle tray apparatus for immunoassays with a plurality of wells. U.S. Pat. No. 4,101,284 discloses an apparatus for dispensing dry beads into any multi-well container, and U.S. Pat. No. 4,415,098 discloses a bead dispenser for gravity feed dispensing beads in dry form. Other patents such as, e.g., U.S. Pat. No. 2,886,208 disclose dispensers for dry items such as pills, tablets, pellets, etc.

Reasons such as stability, however, do not permit all beads to be supplied in dry form. Abbott Laboratories and Beckman Instruments Inc. supply wet beads in an apparatus equipped with a basket to hold the beads. For wet beads the usual instruction by the manufacturer is to drain the beads and then to use forceps or an aspiration device to dispense the beads into reaction tubes. Alternatively, beads can be added with forceps to a device such as the Beckman Immunoassay Processor and then simultaneously added to the reaction tubes.

Use of forceps or aspiration to dispense the beads is undesirable from several points of view: it is laborious, time-consuming and subject to error (dropping of the beads).

It is known that a basket can be used to drain items (see, e.g., U.S. Pat. No. Des. 249,924 for a frying pan). Furthermore, U.S. Pat. No. 4,162,875 describes a cabinet having holes in its side and bottom which will allow for draining materials held in the cabinet. The cabinet can fit inside a second receptacle. Also, U.S. Pat. No. 4,179,040 and the Tupperware catalog (1984), p. 30 describe a container having an inner insert which can be removed to drain the items held in the insert.

SUMMARY OF THE INVENTION

The present invention relates to a wet storage system with built-in drainage for beads and dispensing of beads which circumvents the necessity of using forceps or aspiration to dispense beads which are ordinarily stored and supplied in a liquid medium. In the apparatus and process herein beads used in immunoassays or other processes may be drained of the liquid in which they are stored and dispensed into reaction tubes or trays depending on their ultimate use.

Specifically, the present invention embodies an apparatus for the wet storage of and for the draining and dispensing of beads which is designed so that the liquid medium in which the beads are stored can be captured in a separate compartment from the bead-containing compartment and the beads can be delivered without the liquid medium when the apparatus is inverted, such apparatus being designed so that the liquid medium will join with the beads for storage in the bead-containing compartment when the apparatus is uprighted.

In another aspect the invention relates to an apparatus for storing beads in a liquid medium and dispensing said beads essentially in the absence of said liquid medium comprising a threaded bottle, a container for the beads which is positioned in (and may be attached to) the interior of said bottle and contains at least one drainage port and a threaded open neck, a primary closure cap equipped with threads for the bottle, and a separate dispenser threaded to fit said container.

In a more sophisticated embodiment the apparatus may comprise a bottle and a primary closure cap, said bottle comprising (a) a bottomless funnel located in the interior of said bottle with its widest portion at the bottom of said bottle and its narrowest portion at the neck of said bottle and attached only at the neck of said bottle, which funnel is capable of storing the beads in a liquid medium when the bottle is in an upright position, is capable of draining the liquid medium from the beads into the bottle exterior of the funnel when the bottle is placed on one side or inverted with the cap removed, and contains an outlet hole at its narrow end sufficiently large to pass the beads to the exterior of said apparatus, and (b) a dispenser housing fitted between the neck of said bottle and the funnel which housing contains an escapement mechanism to control dispensing of the beads from the funnel.

In a preferred embodiment the outlet hole in the dispenser housing is sufficiently small that only one bead can pass therethrough at a time. Also preferably the housing contains a mechanism for controlling the dispensing of the beads which will close or partially close the hole when the beads are not to be dispensed.

In another aspect this invention relates to a process for storing, draining and dispensing the beads, essentially in the absence of a liquid medium, by using dispensers such as those described above.

BRIEF DESCRIPTION OF THE DRAWINGS

FIG. 3 depicts a perspective view of a different embodiment of the apparatus described herein wherein the funnel containing the beads is built inside the bottle and the apparatus is positioned on its side.

FIG. 4 depicts a cross-section of the apparatus of FIG. 3, said section being taken on line 4—4 of FIG. 3, showing all of the components of the apparatus without the beads and liquid.

FIG. 5 depicts a schematic cross-section of the apparatus shown in FIG. 3 in an inverted position, where the bead dispenser contains drainage port or ports 20 for draining the liquid. In this figure the level of liquid is above the port to ensure storage of the beads in solution for shipping.

FIG. 6 depicts a schematic cross-section of the inverted apparatus shown in FIG. 3 with the primary closure cap removed, so that the liquid drains through port 20 into the bottle and through outlet hole 18 into a beaker.

FIG. 7 depicts a schematic cross-section of the apparatus of FIG. 3 after most of the liquid has been removed, which apparatus has been uprighted and the cap replaced.

FIG. 8 depicts a schematic cross-section of the apparatus of FIG. 3 positioned on its side and containing liquid and beads.

FIG. 9 depicts a schematic cross-section of the inverted apparatus of FIG. 3 where the opening mechanism placed in the outlet hole is engaged to allow dispensing of a single bead.

DESCRIPTION OF THE PREFERRED EMBODIMENTS

Figure 1:
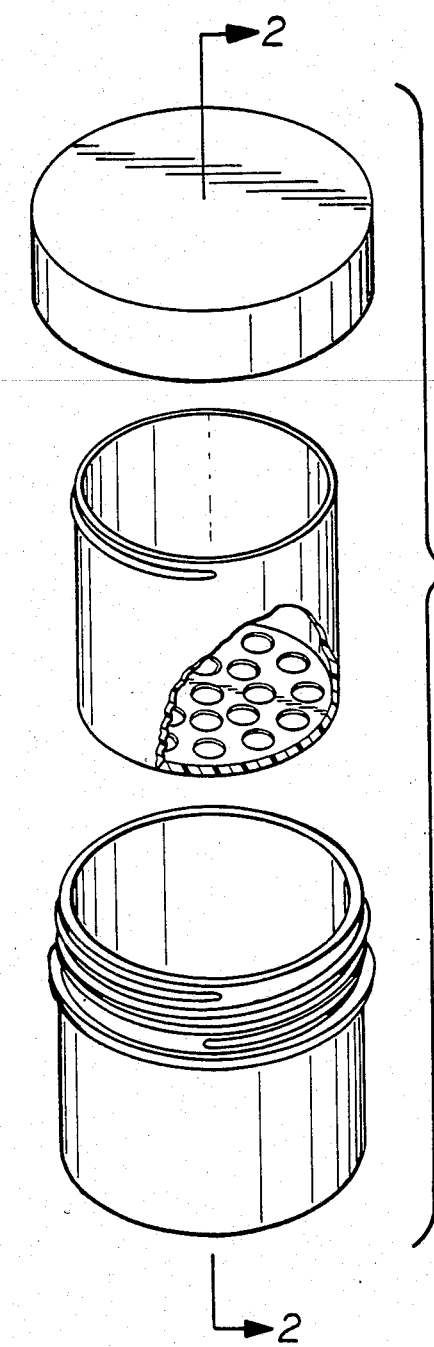
FIG. 1 depicts a perspective view of the components of one embodiment of the apparatus herein wherein a threaded basket is used to contain the beads.

As used herein, the expression dispensing the beads "essentially in the absence of the liquid medium" means that the beads are separated from the bulk of the liquid medium but still have surfaces which may be partially or completely wet with the medium.

The apparatus of the present invention is useful for storing, draining and dispensing beads which are generally stored by submerging in a liquid medium. The beads are preferably spherical and may be composed of any material, such as metal, plastic or polymer material, such as polystyrene. Generally the beads are conjugated or adsorbed to reagents useful in immunoassays or in chemical, biochemical, genetic or immunological testing. Examples of such reagents include proteins, haptens, peptides, polypeptides, DNA, RNA, lipopolysaccharides, carbohydrates, polyclonal and monoclonal antibodies, or any other binder substance specific or selective for a species or subspecies such as, e.g., lectins, boronated gels specific for certain sugars, and other antigens. Preferably the reagent is an antibody or antigen. The beads are typically stored in liquid medium because the material attached to them shows better stability and/or performance characteristics when the beads are kept in liquid rather than dried, or the bead or material attached thereto is air sensitive. The material may be attached to the beads by any technique such as, e.g., the conjugation process described in PCT WO U.S. No. 83/02954, published Sept. 1, 1983 to B. Jacobson, or by simple adsorption.

The size of the beads may vary, but generally the beads range between about 0.45 and 0.80 cm in diameter.

The particular liquid medium in which the beads are stored will depend on the type of bead, reagent attached thereto, and ultimate use. For example, for beads used as solid supports in immunoassays, the liquid medium will typically be a buffer solution in which the beads and reagent attached thereto are stable. For example, polystyrene beads conjugated to antibodies are typically stored in phosphate buffer, tris buffer, or other buffers in the range of pH 6.5-8.5.

The apparatus and process herein for storing, draining and dispensing beads are illustrated more fully in the drawings herein, which illustrate preferred embodiments. Basically, the apparatus functions by enabling the beads to be temporarily separated from the storage liquid by altering the orientation of the apparatus, as by inversion.

FIG. 1 depicts a simple embodiment of the dispensing apparatus herein where a container with a threaded open neck and at least one drainage port, preferably a plurality of drainage ports (e.g., holes) located on its bottom surface is sandwiched between a threaded bottle and a cap. The container is placed inside the bottle and is threaded to fit a separate dispensing unit (shown in FIG. 1a). The dispensing unit is thus threaded to fit the container. The bottle is also threaded to match the bottle cap. The apparatus may be of any material, preferably of a material which will not react with the beads or any coating on the beads.

Figure 1A:
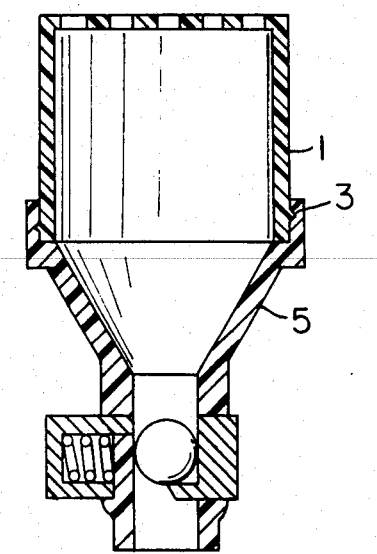
FIG. 1a depicts the basket shown in FIG. 1 attached to a dispensing unit threaded to fit the basket.
Figure 2:
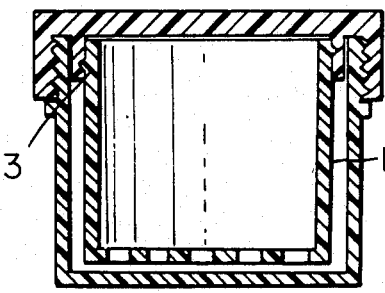
FIG. 2 depicts a cross-section of the apparatus of FIG. 1, said section being taken on line 2—2 of FIG. 1.

FIG. 2 depicts a cross-section of the apparatus with the cap threaded onto the container 1 having threads 3 and the bottle. The beads are placed in the container, which is set into the bottle containing the liquid medium. Sufficient liquid medium is added to the bottle to submerge all of the beads for storage. The cap prevents evaporation of the liquid and contamination thereof. After the cap is removed, the container is lifted out of the bottle so as to drain the liquid medium from the container into the bottle, and a separate dispensing unit 5 shown in FIG. 1a is attached to the container 1 via the threads 3, and then is positioned to dispense each bead, typically by inversion as shown in FIG. 1a.

FIG. 3 depicts the general shape of the preferred apparatus (bottle system 10) with a bottle 11 without a cap. The bottle is equipped with a dispenser housing 14 and an opening for the beads 18 with a button 21 attached to an escapement mechanism which button when pressed allows one or more beads to be dispensed from the bottle. At least one side of the bottle of this preferred embodiment is flat so that the apparatus may be positioned on its side. The apparatus may be composed of any material, such as glass, metal or plastic, and may be opaque or transparent, but is preferably plastic. If the beads or material coated on the beads is sensitive to light, the apparatus is preferably opaque.

FIG. 4 depicts the same bottle system 10 in a cross-sectional view taken along line 4—4 of FIG. 3, and also including a primary closure cap 12. Inside the bottle 11 is a bottomless funnel 13 which is equipped with one or more drainage ports 20 through which the liquid medium can escape into the bottle when the apparatus is positioned on one side or inverted with the cap removed, but through which the liquid does not necessarily escape when the bottle is in an upright position, depending on the liquid level. The funnel has its widest portion at the bottom of the bottle and its narrowest portion at the neck of the bottle and is attached only at the neck of the bottle. The funnel contains an outlet hole 18 at its narrow end sufficiently large to pass the beads to the exterior of the apparatus. The funnel may be permanently attached to the bottle or removable from the bottle. The bottle also contains a dispenser housing 14 fitted within the neck of the bottle which housing contains an escapement mechanism 19 to control dispensing of the beads from the bottle. The escapement may be, e.g., a metal or plastic piece of material which prevents beads from passing through the opening 18. It is attached to a button 21 and a spring 22 such that when the button is pushed the spring is compressed and moves the escapement away from the hole to allow one or more beads to pass through the hole. In FIG. 4 the escapement mechanism consists of two devices, which together interact such that only one bead at a time passes through the outlet hole 18 of the funnel 13. When the button is pressed it engages the escapement mechanism such that the escapement device nearer the neck of the funnel blocks the outlet hole to allow only one bead to be passed into the dispenser housing, while at the same time the other escapement device nearer the outlet hole 18 is moved away from the hole to allow the one trapped bead to escape through the hole. Other configurations for dispensing one bead at a time can be envisioned by one skilled in the art.

Between the bottle and the funnel in FIG. 4 is a sealing member 17 with reservoirs to trap additional liquid and to lend additional support to the funnel.

FIGS. 5–9 illustrate cross sections of the apparatus shown in FIGS. 3 and 4 in various positions to demonstrate the process herein of storing, draining and dispensing the beads. FIG. 5 shows how the beads 15 are stored in the liquid medium 16. The funnel 13 is fitted with the beads 15 and sufficient liquid medium 16 is added to the bottle 11 to submerge all of the beads in the liquid medium for storage. The cap 12 is then attached to the bottle to prevent evaporation and contamination of the stored material. If the cap is a tight seal, the liquid will not escape from the apparatus even when it is inverted as shown in FIG. 5, where the excess liquid fills part of the cap.

FIG. 6 illustrates a cross-section where the cap 12 is removed and the liquid medium is drained from the funnel into the cap 12 or another container and into the bottle exterior of the funnel through the drainage port or ports 20. The beads may then be dispensed, as shown in FIG. 9, one at a time, by pressing the button 21 attached to the escapement mechanism 19, which is attached to the spring 22. This will allow one bead 15 to pass through the opening 18 in the bottle.

After the drainage shown in FIG. 6, or after the dispensing shown in FIG. 9, the cap may be replaced and the bottle uprighted (FIG. 7) to store the beads or placed on its flat side (FIG. 8) to drain or store the beads. FIG. 7 shows that the beads remaining are still submerged after draining some of the fluid from the bottle. FIG. 8 shows that the beads will not be necessarily stored in liquid when the bottle is placed on its side after partial drainage of the liquid. The bottle may be placed on its side to drain the liquid from the beads prior to dispensing the liquid. Alternatively, additional liquid medium may be added to the bottle after it is uprighted prior to storing any remaining beads so that the beads may be completely submerged in the liquid medium.

Several variations and modifications can be made to the apparatus and storing, draining and dispensing process of this invention without departing from the scope and spirit of the invention. All of these variations and modifications are meant to be included in the claims appended hereto.

What is claimed is:

1. An apparatus for storing beads in a liquid medium and dispensing said beads essentially in the absence of said liquid medium comprising a threaded bottle, a container for the beads which is positioned in the interior of said bottle and contains at least one drainage port and a threaded open neck, a primary closure cap equipped with threads for the bottle, and a separate dispensing unit threaded to fit said container.

2. The apparatus of claim 1 wherein the liquid medium is a buffer and the beads are conjugated to an immunoassay reagent.

3. The apparatus of claim 2 wherein the reagent is an antibody or antigen.

4. An apparatus for storing beads in a liquid medium and dispensing said beads essentially in the absence of said liquid medium, comprising a bottle and a primary closure cap, said bottle comprising a bottom, a neck and an interior, and further comprising (a) a bottomless funnel positioned in the interior of said bottle, said funnel having a wide bottom portion and a narrow neck portion and attached only at the neck of said bottle, which funnel is capable of storing the beads in a liquid medium when the bottle is in an upright position, is capable of draining the liquid medium from the beads into the bottle exterior of the funnel when the bottle is placed on one side or inverted with the cap removed, and contains an outlet hole at its neck sufficiently large to pass the beads to the exterior of said apparatus, and (b) a dispenser housing fitted within said neck of said bottle, which housing contains an escapement mechanism to control dispensing of the beads from the funnel.

5. The apparatus of claim 4 wherein said escapement mechanism is provided with a means for allowing only one bead at a time to pass through said outlet hole of said funnel.

6. The apparatus of claim 4 wherein said funnel contains at least one drainage port which is positioned to allow the liquid medium to drain from the beads when the apparatus is positioned on one side or inverted with the primary cap removed.

7. The apparatus of claim 6 wherein said funnel contains a plurality of drainage ports distributed over the entire funnel.

8. The apparatus of claim 4 wherein said liquid medium is a buffer, said beads are conjugated to an immunoassay reagent, and said apparatus is composed of plastic.

9. The apparatus of claim 8 wherein said reagent is an antibody or antigen.

10. The apparatus of claim 4 wherein said funnel is permanently attached to the bottle.

11. The apparatus of claim 4 wherein said funnel is removable from the bottle.

12. The apparatus of claim 4, wherein a sealing member is fitted between the neck of said bottle and said funnel, said sealing member being provided with reservoirs to trap additional liquid and lend additional support to said funnel.

13. A process for dispensing, essentially in the absence of a liquid medium, beads which are stored in a container containing liquid medium and fitted in the interior of a bottle, said bottle having a bottom, a neck, and an interior, and being provided with a primary closure cap at its neck, said container being capable of storing the beads in a liquid medium when the bottle is in an upright position, capable of draining the liquid from the beads into the bottle exterior of the container when the bottle is placed on one side or inverted for dispensing the beads, said container being provided with an outlet hole sufficiently large to pass the beads to the exterior of the bottle and said container further being provided with an escapement mechanism for controlling dispensing of the beads from said bottle, said process comprising inverting said bottle without its cap to drain the beads and engaging said escapement mechanism.

14. The process of claim 13 wherein said liquid medium is a buffer and said beads are conjugated to an immunoassay reagent.

15. The process of claim 14 wherein said reagent is an antibody or an antigen.

16. The process of claim 13 wherein the container is a bottomless funnel positioned in the interior of said bottle with its widest portion at the bottom of said bottle and its narrowest portion at the neck of said bottle and attached only at the neck of said bottle, wherein said escapement mechanism is fitted in a dispenser housing positioned within the neck of the bottle to dispense the beads from the bottle.

17. The process of claim 16 wherein said escapement mechanism is configured such that only one bead at a time passes through said outlet hole of said funnel.

18. The process of claim 16 wherein said funnel contains at least one drainage port which is positioned to allow liquid to drain from the beads when the container is positioned on one side or inverted.

19. The process of claim 18 wherein said funnel contains a plurality of drainage ports distributed over the entire funnel.

20. The process of claim 16 wherein said liquid medium is a buffer, said beads are conjugated to an immunoassay reagent, and said bottle and cap are composed of plastic.

21. The process of claim 17 further comprising after dispensing said beads the steps of capping and uprighting or positioning on one side said bottle so as to store the remaining beads in said liquid medium.

22. The process of claim 21 wherein additional liquid medium is added to the container to restore liquid levels.

23. The process of claim 16 wherein said dispenser housing contains a sealing member on said funnel with reservoirs to trap additional liquid and lend additional structural support to said funnel.

24. A process for storing, draining and dispensing beads, comprising:
providing an apparatus comprising a threaded bottle, a container for the beads which is positioned in the interior of said bottle and contains at least one drainage port and a threaded open neck, a primary closure cap equipped with threads for the bottle, and a separate dispensing unit threaded to fit said container;
filling the container of the apparatus with beads and adding sufficient liquid medium to the bottle to submerge all of said beads in the liquid medium and attaching the cap thereto for storage;
removing the cap;
positioning the container so as to drain liquid medium from the beads;
attaching said dispensing unit to the container; and
dispensing the beads.

25. The process of claim 24 wherein the liquid medium is a buffer and the beads are conjugated to an immunoassay reagent.

26. The process of claim 25 wherein the reagent is an antibody or antigen.

27. A process for storing, draining and dispensing beads, comprising:
providing an apparatus for storing beads in a liquid medium and dispensing said beads essentially in the absence of said liquid medium, comprising a bottle and a primary closure cap, said bottle having a bottom, a neck, and an interior, and further being provided with a bottomless funnel positioned in the interior of said bottle, said funnel having a wide bottom portion and a narrow neck portion and attached only at the neck of said bottle, which funnel is capable of storing the beads in a liquid medium when the bottle is in an upright position, is capable of draining the liquid medium from the beads into the bottle exterior of the funnel when the bottle is placed on one side or inverted with the cap removed, and contains an outlet hole at its neck sufficiently large to pass the beads to the exterior of said apparatus, and a dispenser housing fitted within said neck, which housing contains an escapement mechanism to control dispensing of the beads from the funnel;
filling the funnel of the apparatus with beads and adding sufficient liquid medium to the bottle to submerge all of said beads in the liquid medium and attaching the cap thereto for storage;
removing the cap;
positioning the bottle so as to drain liquid medium from the funnel; and
positioning the bottle to dispense the beads and engaging said escapement mechanism to release the beads, said escapement mechanism being configured such that only one bead at a time passes through said outlet hole of said funnel.

28. The process of claim 27 wherein after dispensing or draining said beads the cap is replaced and the apparatus is uprighted to store the beads or positioned on one side to drain or store the beads.

29. The process of claim 28 wherein after dispensing said beads but before replacing the cap additional liquid medium is added to the apparatus.

30. The process of claim 27 wherein the liquid medium is a buffer and the beads are conjugated to an immunoassay reagent.

31. The process of claim 30 wherein the reagent is an antibody or antigen.

* * * * *